Patented May 22, 1951

2,554,475

UNITED STATES PATENT OFFICE 2,554,475

PROCESS FOR PRODUCING CATIONIC UREA-FORMALDEHYDE RESINS AND PRODUCTS OBTAINED THEREBY

Tzeng-Jiueq Suen, Old Greenwich, and John H. Daniel, Jr., Stamford, Conn., assignors to American Cyanamid Company, New York, N. Y., a corporation of Maine No Drawing. Application March 5, 1947, Serial No. 732,646

9 Claims. (Cl. 260—69)

This invention relates to urea-aldehyde resins and process of preparing same, and, more particularly, it is directed to cationic urea-formaldehyde resins and process of preparing same.

According to the teachings of this invention, an urea-aldehyde resin is modified with a polyfunctional amine by reacting under conditions of pH and temperature such that the resin remains liquid, and, upon cooling increases in viscosity gradually until an infusible, insoluble gel is obtained. Prior to the attainment of the degree of polymerization to insolubility and infusibility, the process is reversible to effect a decrease in viscosity, and the liquid resin may be dried, preferably by spray drying at temperatures between 200°–250° C., to yield a dry powder.

It is therefore an object of this invention to provide a process for the preparation of cationic urea-formaldehyde resins.

It is another object of this invention to provide a process for preparing polyfunctional amine modified urea-formaldehyde resins.

Another object of this invention is to provide a process for the preparation of resins of the class described which will remain liquid at elevated temperatures and increase in viscosity upon cooling.

Another object of this invention is to provide a new series of urea-formaldehyde resins.

A further object of this invention is to provide a series of infinitely water-dilutable polyfunctional amine modified urea-formaldehyde resins, wherein the polyfunctional amine contains at least two functional amino groups.

A still further object of this invention is to provide a process, and the products obtained therefrom, whereby polyfunctional amine modified resins of a desired viscosity and infinite dilutability and possessing cationic charge are obtained.

The foregoing objects and advantages are attained by reacting a polyfunctional amine or salt thereof with urea and formaldehyde or the condensation products thereof at a pH and temperature such that there is no viscosity increase, and aging at a pH and temperature such that the viscosity increases steadily at a controllable rate.

Although the mechanism of the reaction has not yet been completely understood, it appears that two reversible reactions proceed simultaneously in the systems under consideration. For the sake of convenience, these two reactions are called "polymerization" and "depolymerization." At higher temperatures and proper pH conditions, the rate of depolymerization exceeds the rate of polymerization. Therefore, there is no viscosity increase, even after prolonged heating. By lowering the system to below a critical temperature, the rate of polymerization becomes greater than the rate of depolymerization, when the viscosity begins to increase. Furthermore, both the rate of polymerization and the rate of depolymerization depends on pH value as well as the amount of modifying agent added. Consequently, for a given proportion among urea, formaldehyde, and the modifier, pH in conjunction with temperature can be adjusted to control the rate of viscosity increase.

It is believed that the invention will be more fully understood from the description in the following examples given by way of illustration.

Example 1

Two hundred (200) parts of urea was dissolved in 678 parts of a 37% aqueous formaldehyde solution and the pH of the solution adjusted to 8.0–8.8 by the addition of about 7.5 parts of triethanolamine. The mixture was heated to 70° C. and held at 70°–75° C. for about 30 minutes. Twenty (20) parts of tetraethylenepentamine, 47 parts of water and 55.7 parts of 18% hydrochloric acid were then added. As the addition of both of the polyamine and the acid liberated heat, a little cooling was applied. The reaction mixture was maintained at 70°–75° C. for about 1 hour. Its pH dropped from around 3 to 1.6–2.0, during the reaction and remained more or less constant thereafter. After the one hour reaction period, the pH of the solution was adjusted to about 3.0 with sodium hydroxide solution and the solution cooled to 55° C. At this temperature, the viscosity of the resin syrup increased steadily, and was checked from time to time. As soon as the desired viscosity was attained, the syrup was neutralized with sodium hydroxide solution. The neutralized resin was water dilutable and very stable during storage.

Example 2

Two hundred forty parts of urea, 811 parts of a 37% aqueous formaldehyde solution, and 18 parts of a 50% aqueous triethanolamine solution were charged to a suitable reaction vessel. The pH of the mixture was 8.6. The mixture was heated, and in 20 minutes the temperature had risen to 70° C., at which temperature it was held for 15 minutes. Thereafter it was cooled to 65° C., and 24 parts of tetraethylene pentamine, 21 parts of water, 68 parts of 17.7% hydrochloric acid, and 21 parts of water were added in that respective order. The pH of the reaction mixture dropped gradually to 1.8. Heating was continued at 70° C. for approximately 1 hour, and the mixture was cooled to 55° C., and maintained at this temperature. Samples were taken every two minutes with immediate neutralization. Their viscosities estimated at 25° C. by Gardner-Holdt method were as follows:

| Sample | Viscosity |
| --- | --- |
| A | C |
| B | E |
| C | G |
| D | H–I |
| E | J |
| F | K+ |

The above experiment was repeated. After the one hour reaction period at 70° C., the pH of the reaction mixture was adjusted to 2.9 with sodium hydroxide solution, and it was aged at 52° C. Samples taken from time to time and neutralized immediately had the following viscosities:

| Sample | Time Increment, Min. | Viscosity at 25° C. (Gardner-Holdt) |
| --- | --- | --- |
| A | 0 | A |
| B | 15 | B–C |
| C | 33 | G |
| D | 45 | H–I |
| E | 58 | M |
| F | 60 | O |

The above experiment was again repeated. After the one hour reaction period at 70° C., the pH of the reaction mixture was adjusted to 3.5 with sodium hydroxide solution and it was aged at 55° C. Samples taken from time to time and neutralized immediately had the following viscosities:

| Sample | Time Increment, Min. | Viscosity at 25° C. (Gardner-Holdt) |
| --- | --- | --- |
| A | 0 | B |
| B | 10 | B+ |
| C | 29 | B–C |
| D | 49 | D |
| E | 59 | D |
| F | 65 | D–E |

Example 3

Two hundred and forty (240) parts of urea was dissolved in 811 parts of a 37% aqueous formaldehyde solution, and the pH of the solution adjusted to 8.6 with 9 parts of triethanolamine dissolved in 9 parts of water. The mixture was heated to 70°–75° C. and maintained at this temperature for 15 minutes. Twenty-four (24) parts of tetraethylenepentamine, 42 parts of water and 76 parts of 17.7% hydrochloric acid were then added. The reaction mixture was held at 68°–73° C. for approximately 3 hours. The pH of the solution approached a constant value of about 1.7. The viscosity of the syrup remained more or less constant at approximately Gardner-Holdt A₁ throughout the period. When a sample of the unneutralized resin syrup was allowed to cool, it gelled.

One hundred parts of this neutral resinous syrup was heated to 70° C. and reacidified with 4 parts of oxalic acid, although any acid of adequate strength to lower the pH sufficiently could be used. The acidified hot syrup was used to dip-coat and brush-coat wood panels. Upon cooling, hard, strong, water-resistant surfaces formed. Several coatings may be applied to a panel by cooling between coatings. It was also applied to panels which were clamped together. After cooling, a firm bond between the panels was obtained.

Example 4

Four hundred (400) parts of urea, 1356 parts of a 37% aqueous formaldehyde, and 15 parts of triethanolamine were mixed together to give a solution of pH 8.6. It was heated to 70°–75° C. and maintained at this temperature for 30 minutes. Forty (40) parts of tetraethylenepentamine, 110 parts of water and 111.4 parts of 17.7% hydrochloric acid were added. This brought the pH down to 2.0. After keeping the reaction mixture at 70°–75° C. for one hour, the pH of the solution was adjusted to 3.1 with sodium hydroxide solution, and aged at 48°–52° C. until a viscosity of I (Gardner-Holdt at 25° C.) was reached. It was then reheated to 70°–75° C., at which temperature the viscosity of the syrup decreased to A (Gardner-Holdt at 25° C.). It was again cooled to 50° C. with its pH lowered to 2.9 with hydrochloric acid. After about one hour, it began to gel. It was then immediately heated up to 70°–75° C. again. The viscosity of the syrup again decreased to A. It was again aged at 50°–52° C. for about 30 minutes before it was neutralized. The viscosity of final resin syrup was E.

Example 5

Two hundred forty parts of urea, 811 parts of a 37% aqueous formaldehyde solution, and sufficient 10% sodium hydroxide were mixed to give a reaction mixture having a pH of 8.5. This mixture was heated to 70° C. in 15 minutes, and kept at that temperature for ½ hour. It was cooled to 65° C., and 24 parts of diethylene triamine added, followed by 50 parts of water, and the temperature rose to about 70° C. It was again cooled to 65° C., and 54 parts of 18% hydrochloric acid solution added, and again the temperature rose to approximately 70° C.; the pH at this point was 4.2. This mixture was kept at 70°–75° C. for one hour. The pH dropped from 4.2 to 1.7, and remained at 1.7 thereafter. After the one hour reaction at 70°–75° C., the pH was raised to 3.0, by the addition of 10% sodium hydroxide solution, and a sample was taken and neutralized immediately. The viscosity of this sample was about 95 centipoises. The remainder of the mixture was cooled to 55° C., and held for approximately 15 minutes. It was then neutralized to a pH of 7 with sodium hydroxide, and its viscosity was 200 centipoises.

Example 6

One hundred eighty parts urea, 608 parts of a 37% aqueous formaldehyde solution, and 1.2 parts of 10% sodium hydroxide solution were mixed to form a mixture having a pH of 8.4. It was heated to approximately 70°–80° C., and held at that temperature for approximately 30 minutes, after which 18 parts diethanolamine and 34 parts of 17.7 parts of hydrochloric acid were added to give a pH of 1.9. A small sample of this mixture gelled upon cooling. After allowing the reaction mixture to react for approximately 50 minutes at 80° C., and then cooling to 50° C., the viscosity started to increase; whereupon, the mixture was heated to 55° C., at which temperature viscosity increase appeared to be at a slower rate. Seventy-five minutes later, the viscosity was D (Gardner-Holdt at 25° C.), and it was neutralized at this point. The resin syrup was soluble in a mixture of equal parts of alcohol and water.

*Example 7*

Eight hundred eleven parts of a 37% aqueous formaldehyde solution, 240 parts of urea, and 21 parts of a 50% triethanolamine solution were mixed together to give a solution of pH 8.3. It was heated to 70° C. and maintained at this temperature for 30 minutes. Then 52 parts of guanidine hydrochloride was added, followed by 16.3 parts of 18.4% hydrochloric acid solution. The pH of the reaction mixture was 1.45. The mixture was kept at a temperature of 70°–75° C. for approximately one hour, after which time it was cooled to 40°–45° C., and held at that temperature for approximately ½ hour. It was neutralized to give a resinous syrup having a viscosity of F (Gardner-Holdt at 25° C.). One hundred parts of this neutralized resin syrup was heated to 70° C., reacidified with 3 parts oxalic acid, and applied as an adhesive and as a surface finish. Upon cooling, excellent bonds and surface finishes were obtained.

*Example 8*

Eight hundred eleven parts of a 37% aqueous formaldehyde solution, 240 parts urea, and 21 parts of a 50% aqueous triethanolamine solution were mixed and heated to 70° C. in approximately 30 minutes. The reaction mixture was held at that temperature for approximately 30 minutes, after which it was cooled to 60° C., and 49.6 parts guanidine nitrate and 16.3 parts 18.4% hydrochloric acid solution were added. The pH of the resulting mixture was 1.8.

The reaction mixture was held at 70°–80° C. for about one hour. Its pH was adjusted to 2.1 by adding about 2 parts of 10% sodium hydroxide solution. It was then aged at 40°–45° C. Samples were taken at intervals of 10 minutes, and neutralized immediately. The viscosity (at 25° C.) of these samples illustrate an increasing viscosity.

| Sample | Viscosity (Gardner-Holdt) | Viscosity in Centipoises |
|---|---|---|
| A | A | 50 |
| B | B | 65 |
| C | C | 85 |
| D | D–E | 113 |
| E | E–F | 132 |
| F | G | 165 |
| G | L | 300 |
| H | U | 627 |

*Example 9*

Sixty (60) parts of urea was dissolved in 162 parts of a 37% aqueous formaldehyde and the pH of the solution adjusted to 9.1 with 10% sodium hydroxide. The mixture was heated and maintained at 70°–75° C. for 30 minutes. Thirty nine (39) parts of guanidine hydrochloride are then added and the pH of the solution lowered to 2.8 with about 1 part of 17.7% hydrochloric acid. It was refluxed for 1 hour and then cooled to approximately 50° C. After about 20 minutes, it was neutralized to give a syrup of viscosity (Gardner-Holdt at 25° C.) of T. The product could be diluted with water in all proportions.

*Example 10*

One hundred and twenty parts of urea, 405 parts of a 37% aqueous formaldehyde solution, and 0.9 part of 10% sodium hydroxide were mixed to give a reaction mixture of 8.8. This mixture was heated for approximately ½ hour at 70°–75° C., after which time 39 parts of an aqueous solution containing 16 parts of guanylurea was added, followed by 1.1 parts of 18% hydrochloric acid to give a solution having a pH of 1.9. After the mixture was heated at 70°–80° C. for one hour, the pH rose to 2.6, and an addition of 0.5 part of 18% hydrochloric acid, lowered the pH to 2.0. The mixture was cooled to 50°–55° C. and kept at that temperature for about one hour while the viscosity gradually increased. It was then neutralized to a pH of 7.0, with 20% sodium hydroxide. The viscosity of the resinous syrup was D–E (Gardner-Holdt at 25° C.).

*Example 11*

A solution of 240 grams (4 mols) of urea in 811 grams (10 mols) of aqueous 37% formaldehyde was adjusted to a pH of 8.5 by the addition of 20 cc. of a 50% aqueous triethanolamine solution and was then heated at 70°–74° C. for 30 minutes. Thirty two grams of dicyandiamide and 55 cc. of 18.4% hydrochloric acid were then added, the pH after the acid addition being 2.0, and heating was continued at 70°–75° C. for 55 minutes, during which time the pH rose to 4.0. The reaction mixture was cooled and the pH adjusted to 3.5 by adding an additional 1 cc. of 18.4% hydrochloric acid and aged at 45°–55° C. for 1½ hours and then neutralized by adding sodium hydroxide solution. The viscosity of the resulting modified urea-formaldehyde resin syrup was 225 centipoises.

*Example 12*

| | Grams |
|---|---|
| Urea | 120 |
| 37% formalin | 406 |
| 50% triethanolamine solution | 8 |
| 50% epichlorhydrin-tetraethylenepentamine (aqueous resin solution) | 12 |
| Water | 20 |
| Hydrochloric acid (17.7%) | 12 |

The procedure of Example 11 was followed using the epichloro-hydrin-tetraethylenepentamine resin in place of dicyandiamide. The epichlorohydrin resin solution was prepared by adding the epichlorohydrin slowly to a water solution of the tetraethylenepentamine with stirring while maintaining the temperature at about 50° C., followed by continued reaction at the same temperature as described in Example 1 of the copending application of Daniel and Landes, Serial No. 688,334, filed August 3, 1946, but using equimolecular quantities of epichlorohydrin and tetraethylenepentamine.

During the preparation of the modified urea-formaldehyde resin, the pH was 2.8 after adding the hydrochloric acid, and dropped to 2.0 after heating at 70°–80° C. for 30 minutes. After raising the pH to 3.3 by adding NaOH the syrup was aged at 55°–57° C. for 35 minutes before being neutralized with 10% NaOH solution, to give a syrup of 250 centipoises viscosity (at 25° C.).

The process may be satisfactorily employed with urea-formaldehyde resins having a mol ratio of from about 2.0 to about 3.0 mols of formaldehyde per mol of urea.

For optimum results, the ratio of aldehyde to urea is preferably 2.3-2.8. With molar ratios below this range, a substantial quantity of water or the polyfunctional amine is necessarily employed to prevent gelation, and at ratios above this range, the rate of polymerization is so slow that an excessive period of time is necessary to effect any viscosity increase.

The quantity of polyfunctional amine employed does not appear to be critical, though, of course, a minimum amount must be employed to obtain solubility and other desirable properties; and, by like token, satisfactory products may be obtained by reacting the amine at any stage of the reaction; it being preferred, however, to add the amine after the initial reaction of urea and aldehyde. It is usually the procedure in making these resins to use 2-80% polyfunctional amine based on the weight of urea, and for most utilities, it is preferable to use about 6-15%. As examples of polyfunctional amines which have been found to be satisfactory, there may be mentioned the polyamines; such as ethylenediamine, diethylenetriamine, triethylenetetramine, tetraethylenepentamine; the condensation products of polyamines leading to amine polymers such as tetraethylenepentamine and epichlorohydrin or tetraethylenepentamine and formaldehyde; the guanidines, the biguanides, the guanylureas and the salts thereof; and the hydroxylamines such as monoethanolamine, diethanolamine, and the like. Any of the above amines may be first reached with part of the total formaldehyde before adding to the reaction.

These resins, due to the cationic charge thereof, are particularly useful in paper, textile and leather industries. They are particularly useful in effecting a minimum textile shrinkage, and imparting wet strength to paper by beater addition in the paper manufacture. Due to the properties of remaining in liquid state at elevated temperatures, and increasing viscosity to an infusible and insoluble state at lower temperature, such as room temperature, these resins are particularly advantageously employed as adhesives and surface finishes. They may be extended with wood flour, etc., or applied without modification.

When used as surface coatings or adhesives, the acidified hot resins may be applied by brushing, spraying, or dipping, and, upon cooling, set to infusible, insoluble compounds, effecting smooth glossy finishings and tenacious bonds. When a neutralized resin is employed, it is necessary to reacidify prior to using. Due to the cationic properties of the resins, they are particularly useful in ion exchange media when permitted to cool to an infusible, insoluble state.

We claim:

1. A process comprising reacting urea and an aqueous solution of formaldehyde at a temperature of about 70-80° C. for 15-30 minutes under alkaline conditions wherein the mol ratio of urea to formaldehyde is between 1:2 to 1:2.8 adding thereto 2%-80% of a polyfunctional amine based on the weight of urea, adjusting the pH to between 1 and 4 and reacting by heating at a temperature of from 68° C. to reflux temperatures for 15-180 minutes so that there is no viscosity increase and reducing the temperature to a point within the range of room temperature to 55° C. to effect viscosity increase.

2. A process comprising reacting urea and an aqueous solution of formaldehyde at a temperature of about 70-80° C. for 15-30 minutes under alkaline conditions wherein the mol ratio of urea to formaldehyde is between 1:2 to 1:2.8, adding thereto 6%-15% of tetraethylene pentamine based on the weight of urea, adjusting the pH to between 1 and 4 and reacting by heating at a temperature from 68° C. to reflux temperatures for 50-180 minutes so that there is no viscosity increase and reducing the temperature to a point within the range of room temperature to 55° C. to effect viscosity increase.

3. A process comprising reacting urea and an aqueous solution of formaldehyde at a temperature of about 70-80° C. for 15-30 minutes under alkaline conditions wherein the mol ratio of urea to formaldehyde is between 1:2 to 1:2.8, adding thereto 6%-15% of guanidine salt based on the weight of urea, adjusting the pH to between 1 and 4 and reacting by heating at a temperature of from 68° C. to reflux temperatures for 50-180 minutes so that there is no viscosity increase and reducing the temperature to a point within the range of room temperature to 55° C. to effect viscosity increase.

4. A process comprising reacting urea and an aqueous solution of formaldehyde at a temperature of about 70-80° C. for 15-30 minutes under alkaline conditions wherein the mol ratio of urea to formaldehyde is between 1:2 to 1:2.8, adding thereto 6%-15% of the reaction product of epichlorohydrin and a polyalkylene polyamine based on the weight of urea, adjusting the pH to between 1 and 4 and reacting by heating at a temperature of from 68° C. to reflux temperatures for 50-180 minutes so that there is no viscosity increase and reducing the temperature to a point within the range of room temperature to 55° C. to effect viscosity increase.

5. A process comprising reacting urea and an aqueous solution of formaldehyde at a temperature of about 70-80° C. for 15-30 minutes at a pH of 8-9.1 wherein the mol ratio of urea to formaldehyde is between 1:2 to 1:2.8, adding thereto 2%-80% of a polyfunctional amine based on the weight of urea, adjusting the pH to between 1 and 4 and reacting by heating at a temperature of from 68° C. to reflux temperatures for 50-180 minutes so that there is no viscosity increase and reducing the temperature to a point within the range of room temperature to 50-55° C. to effect viscosity increase.

6. A cationic polyfunctional amine modified urea-formaldehyde resin obtained by the process of claim 1.

7. A cationic polyfunctional amine modified urea-formaldehyde resin obtained by the process of claim 2.

8. A cationic polyfunctional amine modified urea-formaldehyde resin obtained by the process of claim 3.

9. A cationic polyfunctional amine modified urea-formaldehyde resin obtained by the process of claim 4.

TZENG-JIUEQ SUEN.
JOHN H. DANIEL, JR.

REFERENCES CITED

The following references are of record in the file of this patent:

UNITED STATES PATENTS

| Number | Name | Date |
|---|---|---|
| 1,734,693 | Ripper | Nov. 5, 1929 |
| 2,245,491 | Menger et al. | June 10, 1941 |
| 2,306,697 | Hayward | Dec. 29, 1942 |
| 2,388,235 | Bowman et al. | Nov. 6, 1945 |